March 12, 1935. W. P. O'NEIL 1,994,004
IMPLEMENT FOR CRUSHING ICE
Filed July 6, 1931
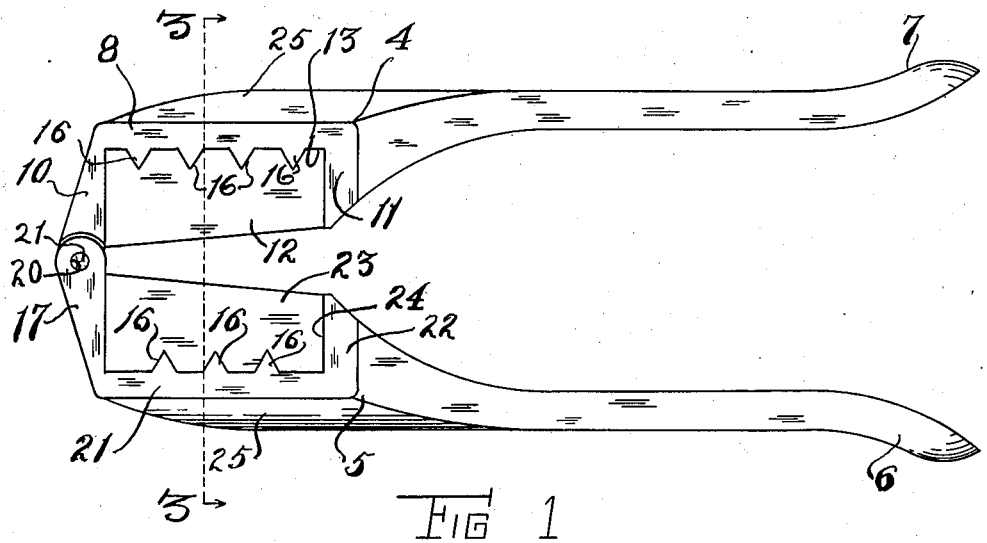
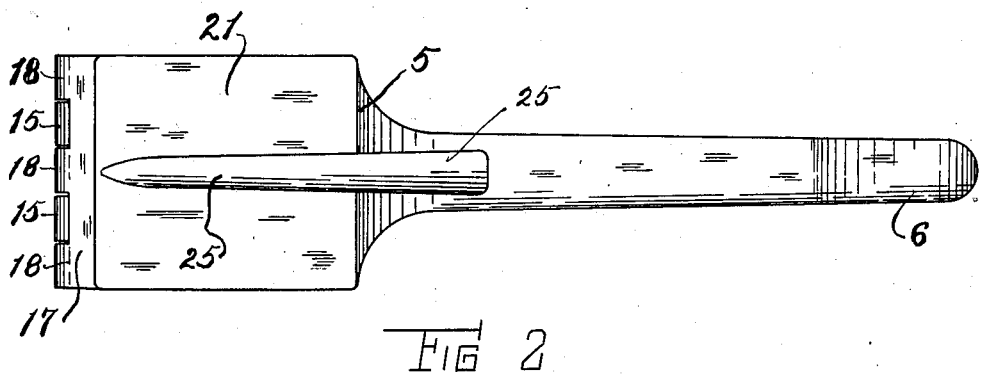
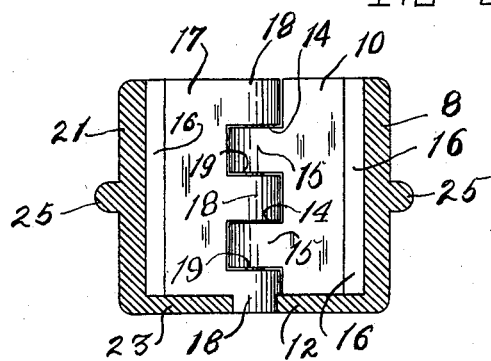
WALTER P. O'NEIL
*INVENTOR*
BY F. E. Sharman
ATTORNEY Patented Mar. 12, 1935

1,994,004

UNITED STATES PATENT OFFICE 1,994,004

IMPLEMENT FOR CRUSHING ICE

Walter P. O'Neil, Akron, Ohio, assignor to Viking Products Company, Inc., Akron, Ohio, a corporation of Ohio Application July 6, 1931, Serial No. 548,779

1 Claim. (Cl. 83—63)

This invention relates to improvements in implements for crushing ice and while adapted for use generally wherever it may be advantageously applied, it is particularly intended for crushing ice cubes in which connection it will be illustrated in the drawing and hereinafter described.

Objects of the invention are to provide an ice crushing implement of simple construction which may be manufactured at a low cost and which may be easily and conveniently operated and will be very efficient in use.

Other objects are to provide an ice crushing implement which when operated will break an ice cube in pieces of a size convenient for use in serving fruit, iced drinks, etc., and which will retain the pieces of crushed or broken ice whereby the same may be conveniently carried in the implement and be conveniently released and deposited wherever desired without dropping or losing any of the ice.

The above objects are accomplished and additional ends are attained by the novel construction, combination and arrangement of parts hereinafter described and illustrated in the accompanying drawing, wherein I have shown a preferred form of the invention, it being understood that the invention is capable of various adaptations and that changes and modifications may be made or resort had to substitutions which come within the scope of the claims hereunto appended.

In the drawing like numerals of reference are used to designate like parts as the same may appear in any of the several views and in which:—

Figure 1 is a top plan view of an implement constructed in accordance with this invention, Figure 2 is a side elevational view of same, Figure 3 is a cross sectional view taken as indicated by the lines 3—3 of Figure 1.

Proceeding now to a detailed description of the invention with reference to the particular adaptation thereof disclosed in the drawing, an implement constructed in accordance therewith consists of two members 4 and 5 which are pivotally connected at one end thereof to form jaws at the pivotal end thereof and the handles 7 and 6 at the free ends thereof. The free end of the member 4 forms a handle which is designated by the numeral 7. The other end of said member is provided with a jaw which consists of a vertical side wall 8, a vertical outer end wall 11 and a bottom wall 12 thereby forming a rectangular seat 13 which is adapted to receive a portion of an ice cube. The end wall 10 is provided on the inwardly projecting edge thereof with rectangular notches 14 forming lugs 15 therebetween. The inner face of the wall 8 is provided with relatively sharp triangular ribs 16 forming teeth which are adapted to engage the side of an ice cube and assist in the crushing operation.

The free end of the member 5 is designated by the numeral 6. At the other end thereof, the member 5 is provided with an end wall 17 which is similar to the wall 10 and which is provided on the inner edge thereof with lugs 18 and notches 19. The lugs 18 are positioned opposite the notches 14 and the lugs 15 opposite the notches 19, and the said lugs are entered in said notches thereby bringing the lugs 18 and 15 in coaxial arranged relation.

The numeral 20 denotes a vertical bore which extends through the lugs 15 and 18 and the said lugs are hingedly secured by means of a pin 21 which extends through the bores 20. The member 5 is provided with a vertical side wall 21 which is similar to the side wall 8; an inner side wall 22 which is similar to the inner wall 11 and a bottom wall 23 which is similar to the bottom wall 12 thus forming a seat 24 which is similar to the seat 13 in the member 4. The side wall 21 is provided with vertical ribs 16 which project into the cavity 23 in offset relation to the ribs 16.

The numeral 25 denotes a horizontal strengthening rib which extends along the outer face of each wall 8 and 21. The ribs 25 merge into the handles 6 and 7 thereby forming an implement of light weight which will be strong and durable.

In use, the handles 6 and 7 are spread apart a sufficient distance to position an ice cube in the seats 13 and 23. The handles 6 and 7 are then forced toward each other with sufficient force to crush and break the cubes as desired. When the handles 6 and 7 have been moved sufficiently to crush the ice cube, the bottom walls 12 and 23 are brought close enough together to retain the crushed ice in the cavity formed by the seats 13 and 23. The implement may then be inverted and the ice released by spreading the handles 6 and 7 whereby the ice after being crushed may be carried in the implement and deposited where desired. The crushing or cutting action is materially aided by the ribs 16 on the wall 8 being disposed in offset relation to the ribs 16 on the wall 21.

It will thus be seen that this invention provides a simple, efficient implement which may be conveniently used to crush ice cubes to the degree of fineness desired.

Having thus illustrated my invention and described the same in detail, what I claim as new and desire to secure by Letters Patent is:—

In a device of the character described, two handles hingedly connected at one end thereof, a box-like jaw adjacent the hinged end of each handle, each jaw having a bottom wall, a side wall and two end walls, said bottom walls movable in the same plane of rotation by operating the handles said jaws cooperating to form an open topped receptacle for an ice cube, means on the side wall of each jaw for initially splitting the ice cube, said jaws adapted to be operated by moving said handles toward each other.

WALTER P. O'NEIL.